United States Patent [19]

Lewis

[11] Patent Number: 4,478,661
[45] Date of Patent: Oct. 23, 1984

[54] METHOD OF MAKING A REINFORCED COLLAPSIBLE HOSE CONSTRUCTION

[75] Inventor: Charles M. Lewis, Ocala, Fla.

[73] Assignee: Dayco Corporation, Dayton, Ohio

[21] Appl. No.: 460,205

[22] Filed: Jan. 24, 1983

Related U.S. Application Data

[62] Division of Ser. No. 245,845, Mar. 20, 1981, abandoned.

[51] Int. Cl.³ .................. B32B 7/08; B32B 31/20; F16L 11/10
[52] U.S. Cl. .................................... 156/92; 138/125; 138/128; 138/141; 138/151; 156/73.1; 156/73.3; 156/93; 156/244.11; 156/244.19; 156/271; 156/308.4
[58] Field of Search .............. 156/73.1, 73.2, 73.3, 156/73.4, 92, 93, 244.11, 244.19, 271, 553, 580.1, 580.2; 138/125, 128, 141, 147, 151, 158, 159

[56] References Cited

U.S. PATENT DOCUMENTS

| | | | |
|---|---|---|---|
| 31,614 | 3/1861 | Mayall | 138/128 |
| 1,956,287 | 4/1934 | Henkel | 156/93 |
| 2,353,960 | 7/1944 | King | 156/93 |
| 2,994,940 | 8/1961 | Ferrell et al. | 156/244.11 |
| 3,205,913 | 9/1965 | Ehlers | 138/125 |
| 3,296,990 | 1/1967 | Simjian | 156/93 |
| 3,308,003 | 3/1967 | Deans | 156/580.2 |
| 3,625,790 | 12/1971 | Ayres | 156/93 |
| 3,927,464 | 12/1975 | Wallsten | 156/93 |
| 3,989,572 | 11/1976 | Swartz | 156/271 |
| 4,010,300 | 3/1977 | Wallin | 156/92 |
| 4,236,952 | 12/1980 | Krause et al. | 156/93 |

Primary Examiner—Michael G. Wityshyn
Attorney, Agent, or Firm—Joseph V. Tassone

[57] ABSTRACT

A method of making a reinforced collapsible hose construction and is provided wherein such hose construction comprises a tubular plastic inner component and a reinforcing tubular fabric cover component wherein the inner component comprises at least one substantially rectangular thermoplastic layer and the cover component comprises at least one substantially rectangular fabric layer with the layers being arranged to comprise the tubular components and being fixed together by bonded portions of the thermoplastic layer to define the hose construction.

9 Claims, 12 Drawing Figures

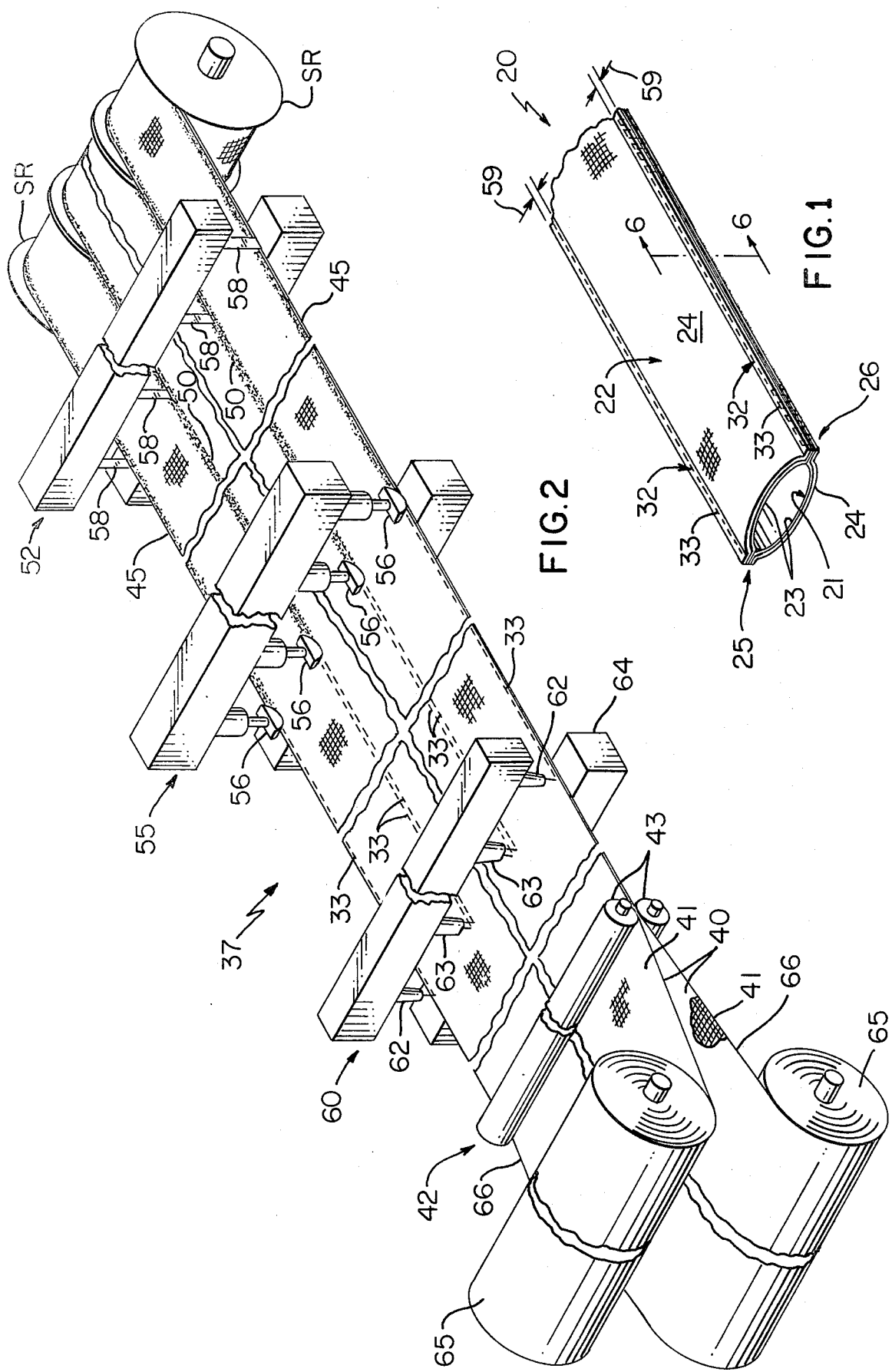

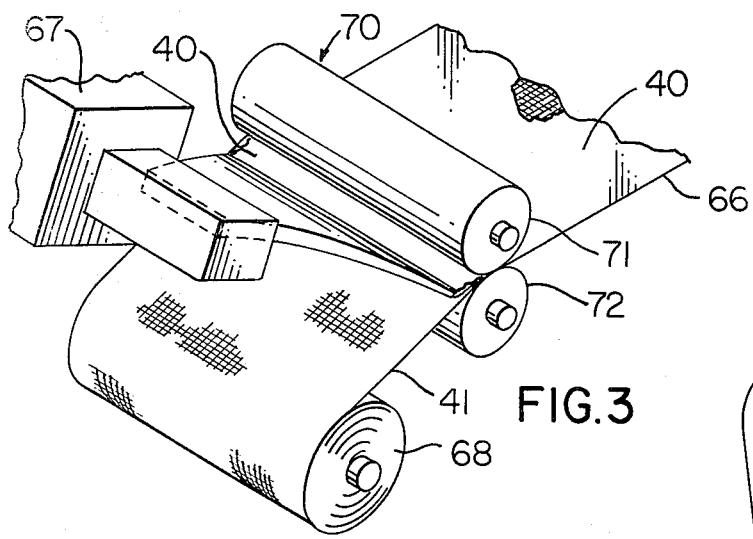
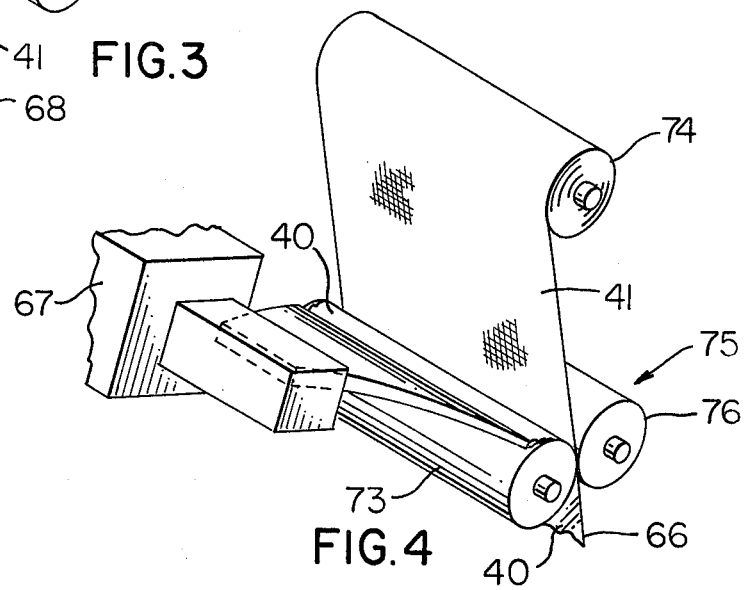
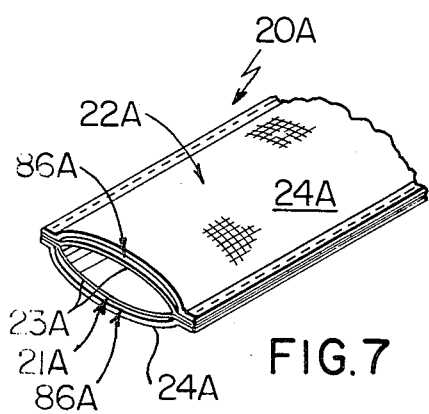
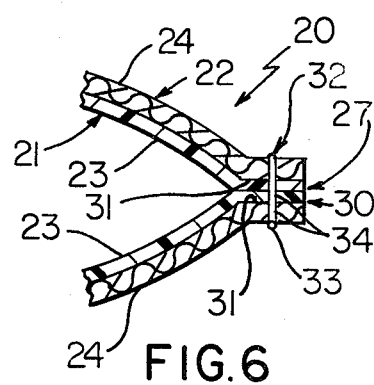
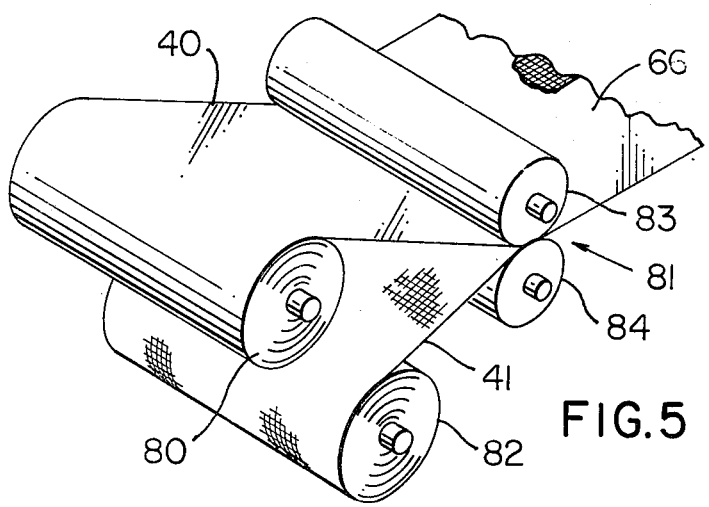

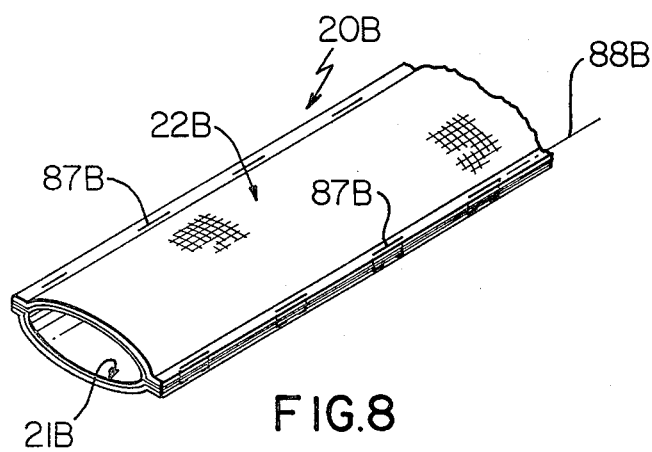
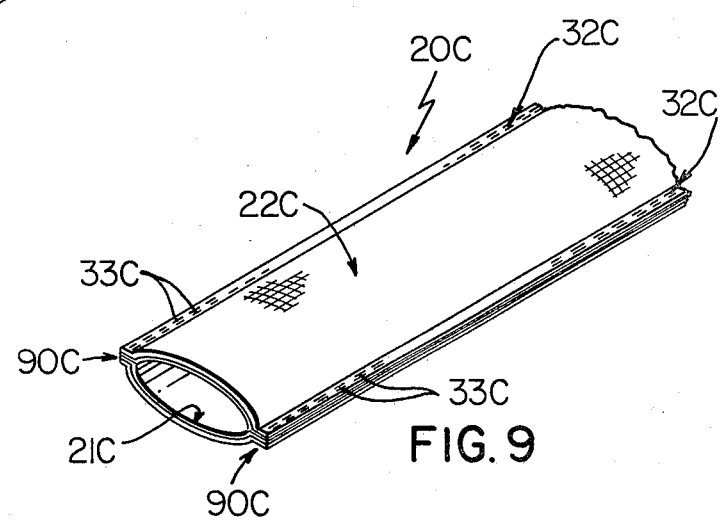
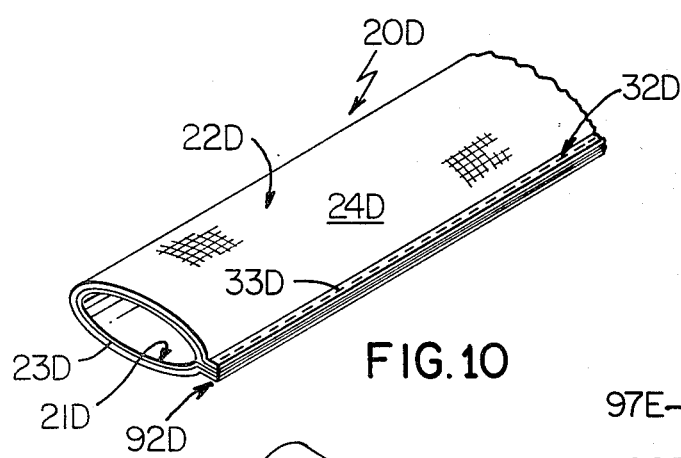
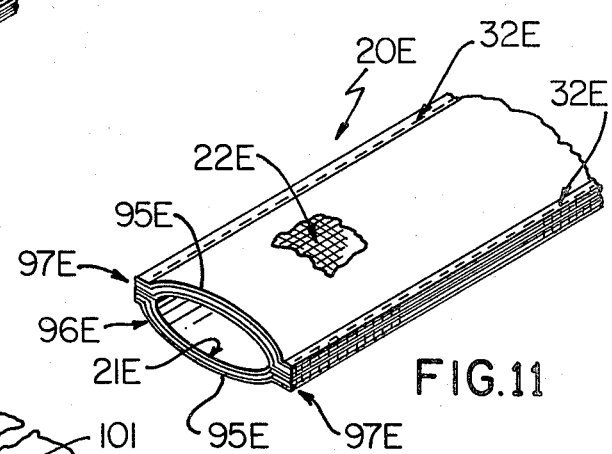
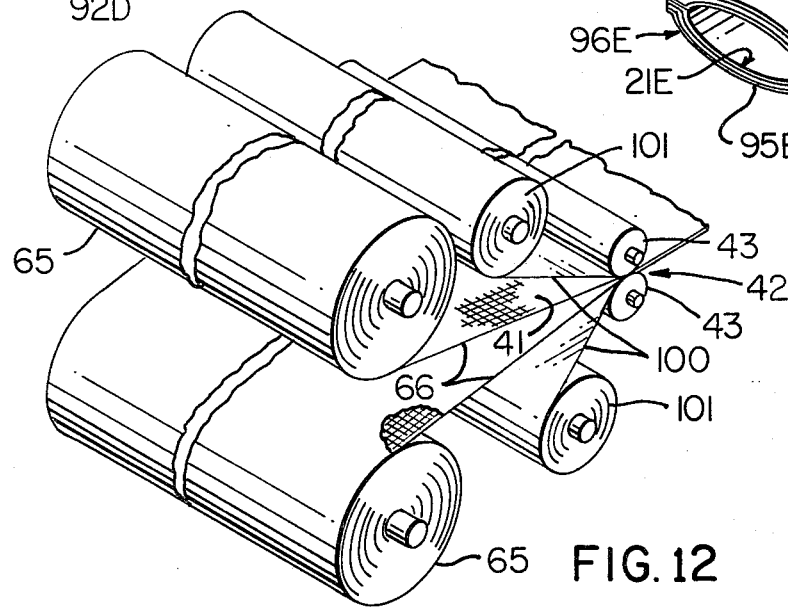

METHOD OF MAKING A REINFORCED COLLAPSIBLE HOSE CONSTRUCTION

CROSS REFERENCE TO RELATED APPLICATION

This application is a divisional patent application of its copending parent patent application, Ser. No. 245,845 filed Mar. 20, 1981, and now abandoned in favor of this divisional application.

BACKGROUND OF THE INVENTION

1. Field of the Invention

This invention relates to a reinforced collapsible hose construction and to a method of making same.

2. Prior Art Statement

It is known in the art to provide a so-called collapsible hose construction of the type which may be coiled or rolled into a compact roll; and, examples of such a hose construction are shown in the following items:

(1) U.S. Pat. No. 3,939,875,
(2) U.S. Pat. No. 4,212,347, and
(3) U.S. Pat. No. 4,220,293.

It appears from item (1) that a permeable plastic tubing is provided consisting of elongated flexible strips which are heat sealed along their longitudinal edges.

It appears from item (2) that a so-called unfurlable heat pipe is provided which can be rolled up and is comprised of two flexible heat conductive sheets bonded together at the edges of their facing surfaces and wherein such sheets are made of flexible material such as aluminum foil.

It appears from item (3) that a reinforced collapsible hose is provided which comprises a tubular plastic inner component and a reinforcing tubular fabric cover. However, although not specifically disclosed in this patent, a hose of this type is usually fabricated by manually inserting a thermoplastic tube inside a prewoven flat loomed fabric cover sheath. The thermoplastic tube is then bonded to the cover sheath by inflating same with hot steam or air.

It has also been proposed in U.S. Pat. No. 4,183,319 to provide a hose, and method of making same, wherein such hose is comprised of a textile jacket and an inner layer of plastic wherein the plastic is initially applied as an outer sleeve and the resulting construction is evaginated.

However, previously proposed hose of the character mentioned have one or more deficiencies including poor collapsibility, poor capability to operate at comparatively high internal pressures, and comparatively high cost.

It is an object of this invention to provide an improved reinforced collapsible hose construction.

Another object of this invention is to provide an improved method of making a reinforced collapsible hose construction.

Other aspects, embodiments, objects, and advantages of this invention will become apparent from the following specification, claims, and drawings.

SUMMARY

In accordance with the present invention there is provided an improved reinforced collapsible hose construction which overcomes the above-mentioned deficiencies. The improved hose construction comprises a tubular plastic inner component and a reinforcing tubular fabric cover component.

In accordance with one embodiment of this invention the inner component of the improved hose construction comprises at least one substantially rectangular thermoplastic layer and the cover component thereof comprises at least one substantially rectangular fabric layer, with the layers being arranged to comprise the tubular components and being fixed together by bonded portions of the thermoplastic layer to define the hose construction.

In accordance with another embodiment of this invention there is provided a reinforced collapsible hose construction comprising a tubular plastic inner component and a reinforcing tubular fabric cover component wherein the inner component comprises a pair of substantially rectangular thermoplastic layers and the cover component comprises a pair of substantially rectangular fabric layers, with the layers being arranged to comprise the tubular components and being fixed together by bonded associated opposite side edge portions of the thermoplastic layers to define the hose construction.

Also provided, in accordance with this invention, is an improved method of making a hose construction of the character mentioned.

BRIEF DESCRIPTION OF THE DRAWINGS

The accompanying drawings show present preferred embodiments of this invention, in which FIG. 1 is a fragmentary isometric view of one exemplary embodiment of the hose construction of this invention;

FIG. 2 is an isometric view illustrating one exemplary embodiment of the method of this invention which may be employed in making a plurality of hose constructions which are substantially identical to the hose construction of FIG. 1 and wherein such plurality of hose constructions are made simultaneously;

FIG. 3 is a fragmentary isometric view illustrating one technique which may be employed in providing a thermoplastic web or layer and coating same on an associated fabric web in carrying out the method of FIG. 2;

FIG. 4 is a view similar to FIG. 3 illustrating another technique which may be employed in providing a thermoplastic layer and coating same on an associated fabric web;

FIG. 5 is a view similar to FIG. 3 illustrating still another technique which may be employed in providing a thermoplastic layer and coating same on an associated fabric web;

FIG. 6 is an enlarged fragmentary cross-sectional view taken essentially on the line 6—6 of FIG. 1;

FIGS. 7, 8, 9, 10 and 11 are views similar to FIG. 1 illustrating other exemplary embodiments of the hose construction of this invention; and FIG. 12 is a view similar to the forward portion of FIG. 2 illustrating a modification of the method of FIG. 2 which may be employed in making the hose construction of FIG. 11.

DETAILED DESCRIPTION

Reference is now made to FIG. 1 of the drawings which illustrates one exemplary embodiment of a collapsible reinforced hose construction or hose of this invention which is designated generally by the reference numeral 20; and, this reference to collapsible hose construction is intended to define hose constructions of the type which when empty of a fluid to be conveyed therethrough may be flattened and wound on a suitable reel, or the like, so as to occupy a minimum volume. The hose 20 may range in diameter from roughly 0.375 to 1 inch for the usual gardening and household applications or such hose may range in diameter from several inches to 1 foot for fire hose and commercial or industrial use. Further, the hose construction 20 is generally capable of carrying fluids at high pressures of the order of hundreds of pounds per square inch gage and as high as 1000 psig, for example.

The hose construction 20 comprises a tubular plastic inner component which is designated generally by the reference numberal 21 and a reinforcing tubular fabric cover component which is designated generally by the reference numeral 22. The inner component comprises at least one substantially rectangular thermoplastic continuous layer and the cover component comprises at least one substantially rectangular thermoplastic fabric layer; however, in this example of the invention the inner component comprises a pair of substantially rectangular thermoplastic layers each designated by the same reference numeral 23 and the outer cover component 22 comprises a pair of substantially rectangular fabric layers each designated by the same reference numeral 24. The layers 23 and 24 are arranged to comprise the tubular components and are fixed together by bonded associated opposite side edge portions of the thermoplastic layers 23 to define the overall hose construction 20.

The bonded side edge portions of the layers 23-24 are disposed on opposite sides of the hose construction 20 as illustrated at 25 and 26. In making the hose construction 20, the inner thermoplastic layers 23 are preferably heated, in a manner to be described subsequently, causing plastic flow of the thermoplastic material comprising same whereby adjoining portions of the two layers 23 are bonded or fixed together as a unitary structure as shown at 27 in FIG. 6. During such heating, outside portions of such layers 23, because of their heated plastic condition, flow and become bonded to inside surface portions of the outer fabric layers 24 as shown typically at 30. In this manner, the layers 23 and 24 are, in essence, fixed together by the heat bonded portions of the thermoplastic layers to define the hose construction 20.

The layers 23 are rectangular layers or ribbons made of substantially fluid-impervious thermoplastic material and the layers 24 are also rectangular layers or ribbons made of thermoplastic material. The utilization of thermoplastic material for the fabric layers 24 assures that inside surface portions 31 thereof become partially molten during heating and are heat fused and bonded to adjoining portions of the inner layers 23.

The hose construction 20 also comprises mechanical fastening means cooperating with the side edge portions of the thermoplastic layers on each side of the hose construction 20 to help hold the bonded opposite side edge portions together; and, in the illustration of FIG. 1, such mechanical fastening means comprises stitch means 32 illustrated as a single row of stitches 33 on each side of the hose construction. Each row of stitches 33 is preferably made using thermoplastic thread and such thread may be of the same thermoplastic material used to make the fabric layers 24. During the process of defining the bonded portions of the thermoplastic layers on each side of the hose construction 20 the stitches 33 also become partially plastic on their outside portions and help seal openings 34 (FIG. 6) initially defined in the various layers 23 and 24 by apparatus used to form such stitches whereby the fluid-impervious character of the inner component 21 is assured.

Having described the hose construction 20, reference is now made to FIG. 2 of the drawings which illustrates one exemplary embodiment of the method of this invention which may be employed in making a plurality of hose constructions which are substantially identical to the hose construction 20 and such method is designated generally by the reference numeral 37. Accordingly, the method comprises making such hose constructions wherein each of the hose constructions comprises a tubular plastic inner component 21 and a reinforcing tubular fabric cover component 22.

The method 37 comprises the step of providing a pair of thermoplastic webs, each designated by the same reference numeral 40, wherein such webs 40 are adapted to define a plurality of tubular plastic inner components 21 as will be readily apparent from the following description. The method 37 also comprises the step of providing a pair of fabric webs, each designated by the reference numeral 41, wherein such fabric webs 41 are adapted to define a plurality of reinforcing tubular fabric cover components 22.

The webs 40 and 41 are placed in stacked relation at a stacking station 42 with the thermoplastic webs 40 against each other. The stacking station 42 is comprised of a pair of cooperating rollers 43 which are adapted to urge the webs 40 and 41 together in sandwiched relation. The webs 40-41 are then suitably fixed together in a plurality of continuous laminated strips which are disposed in spaced relation across the width of the webs; and, such laminated strips comprise laminated side strips 45 adjoining the side edges of the webs and laminated strips 50 disposed intermediate the side strips 45.

The intermediate strips 50 are then suitably cut at a cutting station 52 to define a plurality of the hose constructions 20; and, it will be seen that each hose construction 20 has a pair of laminated strips of substantially equal width or extension defining its opposite sides and such equal width laminated side strips define the bonded side edge portions of the layers illustrated at 25 and 26 in FIG. 1.

As mentioned earlier the method 37 comprises the step of fixing the webs 40-41 together and in this embodiment of the method of this invention such fixing step comprises the step of bonding corresponding strips of thermoplastic webs 40 to each other and to adjoining strips of the fabric webs 41, which are also preferably made of thermoplastic material, with such bonding being achieved at a bonding station 55. The bonding achieved at the bonding station 55 comprises the step of applying heat to partially melt and provide bonding by heat fusion of aligned strips of the webs 40-41. Although any suitable means for applying heat may be used, in this example such heating means comprises applying heat with ultrasonic heating means and a plurality of such heating means is illustrated in FIG. 2, and each designated by the reference numeral 56. In the illustration of FIG. 2 two of the heating means 56 are shown defining the laminated side strips 45 and two of the heating means 56 are shown defining the laminated intermediate strips 50.

It should be emphasized at this point that the reference to bonding of corresponding strips of the thermoplastic webs 40 to each other and to adjoining strips of the thermoplastic fabric webs 41 is intended to define structure wherein strip portions of the webs 40-41 are partially molten and heat fused together and such strip portions of webs 40 and 41 define laminated side strips 45 and laminated intermediate strips 50. This concept is best seen in FIG. 6 which shows an enlarged side edge portion of a completed hose construction 20.

Reference was made previously to the cutting step being achieved at the cutting station 52; and, although any suitable means known in the art may be employed to cut the laminated strips 45 and 50, such strips are preferably cut using ultrasonic knife means shown as a plurality of ultrasonic knives 58. Each ultrasonic knife 58 used to cut an intermediate strip 50 serves to bisect such strip, and each ultrasonic knife 58 used to cut a side strip 45 serves as a trimming knife for such strip.

After cutting of the strips 45 and 50 at the cutting station 52 each completed hose construction 20 has laminated side strips of substantially equal extension 59(FIG.1). These equal extension laminated strips define the bonded side edge portions of the layers 23 and 24 previously described with the layers 23 being defined by webs 40 and the layers 24 by webs 41.

As described above, the webs 40 and 41 are fixed together in a plurality of continuous strips which are disposed in spaced relation across the width of such webs. The fixing step also comprises disposing the mechanical fastening means through the webs in spaced rectilinear paths across the width of such webs and with the paths being at locations where the strips 45 or 50 are to be defined at the bonding station, whereby bonding by heat fusion during the bonding step results in heat fused parts of thermoplastic material completely surrounding the mechanical fastening means. In the illustration of FIG. 6 the mechanical fastening means comprises stitches 33 which are surrounded by thermoplastic material during the bonding step employed in making hose 20.

In this example of the invention the step of disposing the mechanical fastening means is provided at a station 60 where fastening means in the form of stitch means or stitches 33 are provided. As indicated earlier the stitches 33 in this example of the invention are preferably defined by utilizing thermoplastic material or thread similar to the thermoplastic material comprising the web 41. The stitches 33 are provided by stitching or sewing heads 62 and 63 which may be of any suitable type known in the art.

The sewing heads 62 are provided at the side edges of the webs 40-41 and each provides a single stitch 33. The sewing heads 63 are provided in the central portion of the webs and provide a pair of spaced parallel stitches 33. However, regardless of their locations the sewing heads 62 and 63 are provided with suitable needles above the moving webs 40-41 and cooperating components housed within a structure 64 disposed beneath such moving webs so as to provide stitches 33 in accordance with techniques which are known in the art.

As previously mentioned, the method 37 comprises the steps of providing a pair of thermoplastic webs and providing a pair of fabric webs 41; and, as shown in the left hand portion of FIG. 2 each thermoplastic web 40 is bonded or laminated against an associated fabric web 41 to define a laminated structure or lamination 66 which is provided on a supply roll 65 thereof and supported for unwinding rotation.

Each laminated structure 66 may be made by first defining each thermoplastic web 40 as illustrated in FIG. 3. In particular, each web 40 of FIG. 3 is defined by extrusion thereof from an associated conventional extruder 67 and the extruded web 40 is simultaneously bonded against an associated fabric web 41 which is unwound from supply roll 68 thereof. The bonding action is achieved at a bonding station 70 comprised of a pair of cooperating rollers 71 and 72 which are of a type which is well known in the art.

Each laminated structure 66 may also be provided as illustrated in FIG. 4 wherein each thermoplastic web is defined by extrusion thereof from a conventional extruder 67 against an associated roller 73 of known construction, and immediately thereafter the extruder web 40 is bonded against an associated fabric web 41. The fabric web 41 is unwound from a supply roll 74 thereof and the bonding is achieved at a bonding station 75, comprised of roller 73 and a cooperating roller 76, to define the laminated structure 66. It will be appreciated that additional cooperating rollers may be used at station 75 to complete the structure 66.

The laminated structure 66 may also be defined by providing a thermoplastic web 40 from an independent supply roll 80 thereof and bonding such thermoplastic web 40 at a bonding station 81 to an associated fabric web 41 which is also provided on a suitable supply roll 82 thereof. A pair of cooperating rollers 83 and 84 are provided at the bonding station 81 to define the laminated structure 66.

Having described the hose construction 20 of this invention and the preferred method of making same, including modifications of such method, reference is now made to FIGS. 7, 8, 9, 10, and 11 of the drawings which illustrate other exemplary embodiments of the hose construction of this invention. The hose constructions of FIGS. 7, 8, 9, 10, and 11 are very similar to the hose construction 20 and thus will be designated by the reference numerals 20A, 20B, 20C, 20D, and 20E respectively and representative parts of each hose construction which are similar to corresponding parts of the hose construction 20 will be designated in the drawings by the same reference numerals as in the hose construction 20 (whether or not such representative parts are mentioned in the specification) followed by an associated letter designation, either A, B, C, D, or E and not described again in detail. Only those components parts of each hose construction which are different from corresponding parts of the hose construction 20 will be designated by a new reference numeral also followed by an associated letter designation and described in detail.

The hose construction 20A of FIG. 7 comprises the tubular plastic inner component 21A comprised of substantially rectangular thermoplastic layers 23A and tubular fabric cover component 22A comprised of substantially rectangular fabric layers 24A. Each of the rectangular thermoplastic layers is detached from an associated rectangular fabric layer throughout the interface thereof intermediate its bonded opposite side edge portions. This detachment is shown in an exaggerated manner at 86A for the two layers 23A in FIG. 7.

The hose construction 20B of FIG. 8 comprises the tubular inner component 21B and tubular fabric cover component 22B and comprises mechanical fastening means which cooperate with the side edge portions of thermoplastic layers on each side of the hose construction to help hold the bonded opposite side edge portions fixed together; and, such fastening means comprises at least one row of thermoplastic staples 87B on each side of the hose construction 20B. The thermoplastic staples 87B on each side are disposed with their elongate dimension in an aligned rectilinear path 88B; and, such thermoplastic staples are preferably made of the same thermoplastic material as the thermoplastic material used to make the outer cover 22B or a thermoplastic material which is compatible with such cover.

It will be appreciated that a plurality of hose construction 20B may be made using the method 37 and substituting stapling heads for the heads 62 and 63. After stapling, the staples 87B are passed through the bonding station 55 whereby the outside portions thereof become partially molten and fused to adjoining thermoplastic materials thereby assuring the provision of a fluid tight seal for the hose construction 20B around the staples 87B.

The hose construction 20C of FIG. 9 is comprised of a tubular inner component 21C and a reinforcing tubular fabric cover component 22C and stitch means 32C. The stitch means 32C consists of two rows of stitches 33C of thermoplastic material on each side of the hose construction and is illustrated typically at 90C. The stitches 33C may be provided using stitching heads similar to heads 62 and 63 which have been modified to provide multiple rows of stitches.

The hose construction 20D of FIG. 10 is a bifolded construction. The bifolded construction illustrated in FIG. 10 comprises a tubular plastic inner component 21D comprised of one rectangular thermoplastic layer 23D and a tubular cover component 22D comprised of one rectangular fabric layer 24D. The layers 23D and 24D are disposed with their peripheral edges in aligned relation and bifolded with opposite side edge portions of the thermoplastic layer in adjoining relation and corresponding opposite side edge portions of the fabric layer against the adjoining side edge portions of the thermoplastic layer as illustrated at 92D. The bonded portions of the thermoplastic layer 23D serve to fix the opposite side edge portions in a high strength manner and complete the hose construction 20D. The hose construction 20D also has mechanical fastening means in the form of stitch means 32D consisting of a single row of stitches 33D.

The hose construction 20E of FIG. 11 comprises an inner tubular component 21E, an outer cover component 22E, and also comprises a pair of outer substantially rectangular thermoplastic layers 95E defining a tubular component 96E. The layers 95E serve the multiple purpose of reinforcing, protecting, and improving the aesthetic appeal of the hose construction 20E. The outer layers 95E are fixed in position by opposite side edge portions thereof bonded against corresponding portions of the fabric layers, as shown at 97E, at each side of the hose construction 20E. The hose construction 20E also has stitch means 32E on each side thereof.

A plurality of hose constructions 20E may be made employing the method 37 as modified to enable provision of the outer layers 95E thereof. Accordingly, FIG. 12 illustrates a modification of the method 37 wherein a pair of webs 100 are disposed on opposite sides of the laminated structures 66 and the webs are made of suitable thermoplastic material.

Each web 100 is provided on a suitable supply roll 101 thereof and supported for unwinding rotation and each laminated structure 66 is provided on an associated supply roll 65 thereof. The webs 100 and structures 66 are moved into the stacking station 42 between the rollers 43 and in a similar manner as previously described. Stitch means is provided through the webs 100 and structure 66 at a station which is substantially identical to the station 60 and also in the manner described previously. The resulting construction is processed through the remainder of components and stations of the method 37, as described earlier to define a plurality of hose constructions 20E.

Reference has been made throughout this disclosure to the hose construction comprising a tubular plastic inner component and a reinforcing tubular fabric covered component. However, it is to be understood that the tubular configuration of each of these components is defined by either a pair of rectangular sheets or layers or a single rectangular sheet or layer. For example, each of the inner components 21, 21A, 21B, 21C and 21E is defined by a pair of rectangular fluid impervious thermoplastic layers while the tubular inner component 21D is defined by a single rectangular fluid impervious thermoplastic layer. Similarly, each reinforcing tubular fabric cover component 22, 22A, 22B, 22C and 22E is defined by a pair of rectangular fabric layers while the tubular cover component 22D is defined by a single rectangular fabric layer.

The method 37 of this invention enables the simultaneous forming of a plurality of collapsible reinforced hose constructions and it will be appreciated that in each instance each of such hose constructions may be individually wound on an independent supply roll therefor with a pair of typical supply rolls being designated by the reference numeral SR in FIG. 2 of the drawings.

In the presentation of the method of this invention it will be seen that the supports for the various rolls, rollers, and components employed in carrying out such method; heating and/or cooling means for certain rollers; power sources; controls; and the like have not been illustrated and described; however, it will be appreciated that these items will be provided, as is known in the art, to enable carrying out the method.

In this disclosure of the invention a particular mechanical fastening means has been presented with a particular hose construction; however, it will be appreciated that such fastening means may be used interchangeably on any of the hose constructions of this invention.

Each hose construction of this invention preferably utilizes a fluid impervious inner tube or component made of thermoplastic material. Further, each outer component, including the sleeve component 96E of hose 20E, is also preferably made of thermoplastic material. However, it is to be understood that each reinforcing tubular fabric cover component need not necessarily be made of thermoplastic materials. In the event the fabric cover component is not made of thermoplastic material it is preferred that it be such that thermoplastic material will readily adhere thereto in a high strength and tenancious manner.

The hose construction of this invention may be of any suitable size within the range previously described. A typical garden hose made in accordance with this invention would have an effective flow diameter of $\frac{5}{8}$ of an inch and such a garden hose would preferably be made using a polyester elastomer 0.005–0.010 inch thick to define the inner tube thereof. An example of a polyester elastomer which would be preferred is sold by the E. I. Dupont de Nemours and Company, 1007 Market Street, Wilmington, Del. 19898, under the registered trademark "Hytrel." Such a $\frac{5}{8}$ inch hose construction would also use a reinforcing tubular fabric cover component preferably made of a square woven polyester fabric material having warp and weft threads or yarns ranging between 1000 and 2000 denier. The square woven polyester fabric would be arranged with the warp yarns thereof parallel to the longitudinal axis of the hose and the weft yarns disposed perpendicular to such longitudinal axis.

However, it is to be understood that the reinforcing tubular fabric cover component of the hose construction of this invention need not necessarily be made of a square woven fabric material. Indeed, such cover component may be made of any woven or non-woven material known in the art.

In this disclosure of the method of this invention the bonding step has been described as utilizing ultrasonic means to provide the described bonding action. Similarly, the cutting step has been described as utilizing ultrasonic cutting means. However, it will be appreciated that any suitable means known in the art may be provided to provide bonding and/or cutting.

While present exemplary embodiments of this invention, and methods of practicing the same, have been illustrated and described, it will be recognized that this invention may be otherwise variously embodied and practiced within the scope of the following claims.

What is claimed is:

1. In a continuous method of making a collapsible reinforced hose construction comprising the steps of providing a tubular plastic inner component and providing a reinforcing tubular fabric cover component, the improvement in said method wherein said step of providing said inner component comprises providing a pair of substantially rectangular thermoplastic continuous layers, said step of providing said cover component comprises providing a pair of substantially rectangular fabric thermoplastic layers, and said method comprises the further steps of placing said layers with associated side edges thereof in aligned relation and with said thermoplastic continuous layers against each other, fixing all of said layers simultaneously together; said step of fixing including disposing thermoplastic fastening means through all of said layers so as to be located at and in said side edge portions and heat bonding all of said layers together by fusing associated edge portions of said thermoplastic continuous layers to each other and to adjoining side edge portions of said fabric layers and simultaneously heat bonding said thermoplastic fastening means to both sides of side edge portions of said layers as well as in said layers.

2. In a continuous method of making a plurality of collapsible reinforced hose constructions each comprised of a tubular plastic inner component and a reinforcing tubular fabric cover component, the improvement wherein said method comprises the steps of providing a pair of thermoplastic continuous webs which are adapted to define a plurality of said tubular plastic inner components, providing a pair of thermoplastic fabric webs which are adapted to define a plurality of said reinforcing tubular fabric cover components corresponding in number to said inner components, placing said webs in stacked relation with said thermoplastic continuous webs against each other, fixing all of said webs simultaneously together in a plurality of continuous laminated strips disposed in spaced relation across the width of said webs, some of strips being disposed adjoining the edges of said webs and others of said strips intermediate said edges; said fixing step including the step of disposing thermoplastic fastening means through all of said webs so as to be located at and in said laminated strips thereof, said fixing step further comprising the step of heat bonding corresponding strips of said thermoplastic continuous webs to each other and to adjoining strips of said fabric webs as well as simultaneously heat bonding said thermoplastic fastening means to both sides of said strips and in said strips; and cutting said intermediate strips to define said plurality of hose constructions each having a pair of laminated strips defining opposite sides thereof.

3. A method as set forth in claim 2 in which said step of disposing mechanical fastening means comprises the step of disposing stitch means.

4. A method as set forth in claim 2 in which said step of disposing mechanical fastening means comprises the step of disposing stitch means consisting of two parallel stitches in each said laminated strip.

5. A method as set forth in claim 2 in which said step of disposing mechanical fastening means comprises the step of disposing thermoplastic staples.

6. A method as set forth in claim 2 in which said step of providing a pair of thermoplastic continuous webs comprises defining each thermoplastic continuous web by extrusion thereof and simultaneously bonding the extruded web against an associated one of said pair of fabric webs.

7. A method as set forth in claim 2 in which said step of providing a pair of thermoplastic continuous webs comprises defining each thermoplastic continuous web by extrusion thereof from an extruder against an associated roller, and immediately thereafter bonding the extruded web against an associated one of said pair of fabric webs prior to said placing step.

8. A method as set forth in claim 2 in which said step of providing a pair of thermoplastic continuous webs comprises providing each of said thermoplastic continuous webs from an independent supply roll thereof and maintaining each thermoplastic continuous web free of bonding between each thermoplastic continuous web and its associated fabric web.

9. A method as set forth in claim 2 in which said step of providing a pair of thermoplastic continuous webs comprises providing each of said thermoplastic continuous webs from an independent supply roll thereof and bonding each thermoplastic continuous web to an associated one of said pair of fabric webs prior to said placing step.

* * * * *